Jan. 16, 1968   TOM T. TAKAHASHI   3,363,892
SPRING BOOSTER FOR DRIVE ROLLER ON LAWN MOWERS
Filed July 16, 1965

INVENTOR.
TOM T. TAKAHASHI
BY
Elliott & Pastoriza
ATTORNEYS

United States Patent Office 3,363,892
Patented Jan. 16, 1968

3,363,892
SPRING BOOSTER FOR DRIVE ROLLER ON LAWN MOWERS
Tom T. Takahashi, 1332 W. Guava St., Oxnard, Calif. 93030
Filed July 16, 1965, Ser. No. 472,527
1 Claim. (Cl. 267—1)

ABSTRACT OF THE DISCLOSURE

This disclosure relates to a compression spring structure secured at one end to a sleeve slidable over a straight rod passing through the spring, the other end of the compression spring abutting against a stop collar which may be adjustably positioned on the rod. The sleeve includes an integral upwardly facing hook member and the lower end of the rod terminates in a fork structure defining a channel. With this arrangement, a gardener may insert the fork structure or channel over the frame holding the power roller of his lawn mower and then insert the upwardly facing hook structure in a portion of the main frame of the mower, the compression spring urging the fork or channel portion away from the hook member to thereby increase the traction of the power roller against the ground.

---

This invention relates generally to lawn mower attachments and more particularly, to a spring booster attachment for increasing the traction of the drive roller on a power driven lawn mower.

In conventional use, certain types of power mowers are driven over the ground by means of a power driven roller which directly contacts the ground. The mower is thus propelled due to the frictional or tractive engagement of the roller with the surface of the ground. The degree of frictional or tractive engagement is, among other things, a function of the force urging the roller against the ground. This force is usually provided by biasing springs forming a part of the movable frame structure supporting the roller. However, it has been found in many instances that the traction of the roller is insufficient to prevent slippage or spinning of the roller under certain mowing conditions, for example when mowing on an up-grade or through particularly course and dense grass.

With the foregoing in mind, it is accordingly a primary object of this invention to provide a novel spring booster attachment which serves to increase to a desired amount in an adjustable manner the tractive force of the driving roller of a power driven lawn mower.

Another object is to provide a spring booster device meeting the foregoing object and which may be quickly and easily attached to and removed from a drive roller type power mower without requiring any special tools or modification of the structure of the mower itself.

Other objects are to provide a spring booster device which is compact, rugged in construction, and may be economically manufactured.

Briefly, these and many other objects and advantages of this invention are attained by providing a spring booster attachment including a rod member having means on one end for attachment to a movable frame member for the drive roller of a lawn mower. The other end of the rod member has means adapted to be attached to a frame portion of the mower stationary with respect to the roller frame. This latter means includes a sleeve and hook member slidable along the rod and biased by a spring member adjustably secured to the rod member.

Preferably, the means attaching the rod to the drive roller frame comprises a swivel clamp having an open channel therein which allows the clamp to be quickly and easily attached to the frame.

When installed, the spring will be in compression thus tending to force the roller mounting frame in a direction away from the relatively stationary portion of the mower to which the hook member is attached. By adjusting the point of securement of the spring to the rod, a means is provided for adjusting the amount of force urging the drive roller into engagement with the ground. The frictional or tractive force of the roller with respect to the ground is, therefore, controllable.

A better understanding of the invention will be had by now referring to a preferred embodiment thereof as illustrated in the accompanying drawings, in which.

Figure 1:
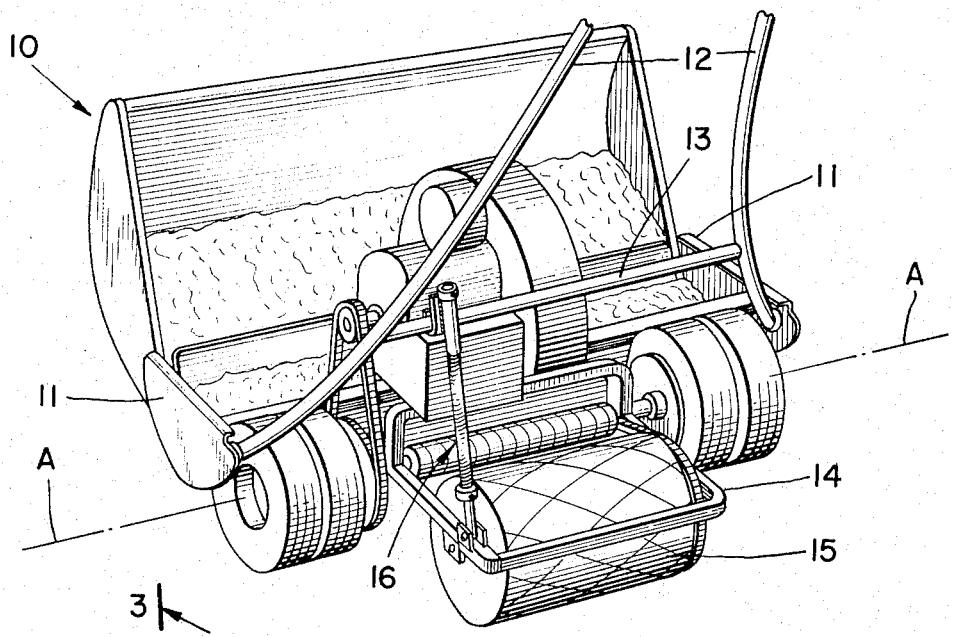
FIGURE 1 is a perspective view of a power mower with the novel spring booster attachment of this invention installed therein.

Referring now to FIGURE 1, there is shown a conventional power mower 10 having a main frame 11. Attached to and extending upwardly from the main frame 11 are handle bars 12 which normally include a cross-bar 13 attached to and extending therebetween. Pivotally attached to and extending outwardly from the frame 11 is a U-shaped drive roller frame 14 supporting a drive roller 15.

The drive roller mounting frame 14 is normally biased to swing about the axis A—A of its pivoted connection to the main frame by small springs (not shown) to thereby urge the roller 15 against the ground.

To increase the biasing force applied to the roller and thereby increase the traction of the roller there is provided the spring booster of this invention shown at 16 attached to and extending between the cross-bar 13 and roller frame 14.

Figure 2:
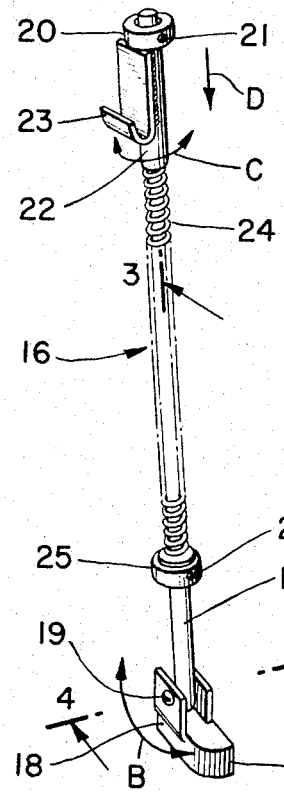
FIGURE 2 is a perspective view of the spring booster attachment.

Referring now to FIGURE 2, the spring booster 16 includes a cylindrical rod 17 to which is attached a swivel clamp 18 by means of a bolt 19. The swivel clamp 18 is free to pivot about the bolt 19 as indicated by the double headed arrow B. The clamp 18 is preferably provided with a rounded corner portion 18'.

The other end of rod 17 terminates in a stop collar 20 secured to the rod 17 by a set screw 21. Surrounding the rod 17 adjacent the collar 20 is a sleeve 22 which has a hook member 23 integrally attached thereto. The sleeve 22 and hook 23 are free to turn about the rod 17, as shown by the double headed arrow C and free to slide longitudinally away from the stop collar 20 as indicated by the arrow D. The sleeve 22 and hook 23 are normally biased upwardly by one end of a coil spring 24. The other end of the spring 24 abuts against a spring anchor 25 secured to the rod 17 by means of a set screw 26.

Figure 3:
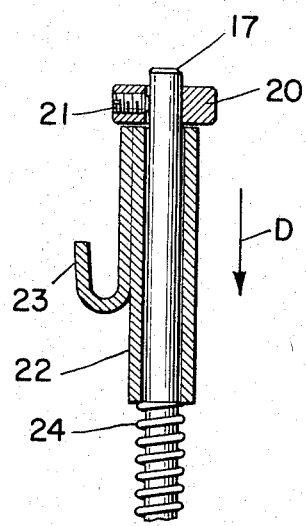
FIGURE 3 is a cross-section taken in the direction of arrows 3—3 of FIGURE 2; and, FIGURE 4 is a cross-section taken in the direction of arrows 4—4 of FIGURE 2.

Referring now to FIGURE 3, it will be seen that the sleeve 22 and integrally attached hook 23 are normally biased upwardly by the compressed coil spring 24. The sleeve 22 and hook 23 thus abut against the collar 21 when the booster is free of the lawn mower. When the sleeve 22 and hook 23 are moved downwardly in the direction of arrow D, the coil spring 24 will be further compressed.

Figure 4:
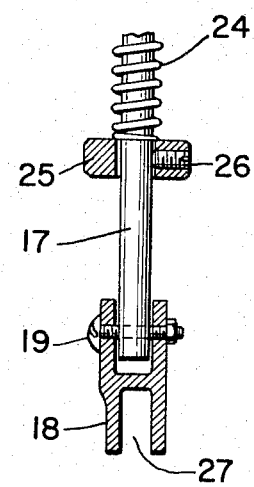

Referring now to FIGURE 4, it will be seen that the compression force exerted by the spring 24 may be adjusted by simply loosening the set screw 26 and moving the spring anchor 25 up or down the rod 17 to any desired point.

In the view of FIGURE 4, it will be noted that the underside of swivel clamp 18 includes a channel 27 which is adapted to be fitted over the frame of the drive roller on the mower.

In operation, whenever the mower is to be used on an upgrade or to cut coarse and dense grass wherein greater traction power is necessary, the booster is attached to the mower. Thus, the channel 27 in the swivel clamp 18 is simply placed over a portion of the frame member 14 and preferably on a corner thereof. The sleeve 22 and hook 23 are moved downwardly on the rod thus compressing the spring 24 and the hook 23 is then placed under the cross-bar 13. The energy of the compressed spring 24 increases the biasing force tending to pivot the frame 14 downwardly and away from the cross-bar 13. Thus, the force with which the roller 15 engages the ground is increased along with the frictional or tractive force of the roller with respect to the ground. To adjust the extent of the increase, the spring anchor may be moved up or down along the rod to adjust the force exerted by the spring and then locked in position by the set screw 26.

When it is desired to remove the attachment from the mower, the sleeve 22 and hook 23 are slid downwardly against the spring 24 and the hook moved away from the cross-bar 13. The attachment device is then simply lifted away from the frame member 14.

From the foregoing description, it will thus be evident that the present invention has provided a novel spring booster attachment which enables the traction of the drive roller of a power mower to be easily adjusted if and when desired by a simple installing operation requiring no special tools or modification of the structure of the mower.

What is claimed is:

1. A spring booster adapted to be mounted between a movable drive roller frame on a power mower and a portion of the main frame of the mower to increase the traction force of said roller, comprising: a rod member having a swivel clamp pivotally attached to one end thereof, said clamp having a channel for receiving a corner of said roller frame; a sleeve member surrounding said rod so as to be slidable thereon; an upturned hook member secured to said sleeve so as to be integral therewith, said hook member being positioned to engage said portion of said main frame; a coil spring encircling said rod and having an end thereof abutting the bottom of said sleeve; and a spring anchor adjustably secured to said rod, said spring anchor forming an abutment for the other end of said spring, whereby the position of said spring anchor determines the force exerted by said spring to force said drive roller frame downwardly with respect to said portion of said mower frame; and a stop collar secured to the end of said rod opposite said one end to which said swivel clamp is pivoted to prevent said sleeve and hook member from sliding off the end of said rod.

References Cited

UNITED STATES PATENTS

| | | | |
|---|---|---|---|
| 1,340,581 | 5/1920 | Van Brunt | 267—1 |
| 1,506,820 | 9/1924 | Erdman et al. | 267—1 |
| 2,629,222 | 2/1953 | Johnston | 267—1 |
| 3,023,825 | 3/1962 | Rabjohn | 180—15 |

ARTHUR L. LA POINT, *Primary Examiner.*

R. M. WOHLFARTH, *Assistant Examiner.*